United States Patent Office 3,421,921
Patented Jan. 14, 1969

3,421,921
COLORED, TRANSPARENT, DURABLE
TITANIA FILMS ON GLASS
Albert E. Junge, New Kensington, and Joseph Chabal,
Curtisville, Pa., assignors to PPG Industries, Inc., Pittsburgh, Pa., a corporation of Pennsylvania
No Drawing. Filed July 25, 1966, Ser. No. 567,388
U.S. Cl. 106—287                   12 Claims
Int. Cl. C09d 5/00

ABSTRACT OF THE DISCLOSURE

A stable solution for coloring transparent glass articles without destroying their transparency. The solution is composed of a mixture of a hydrolyzable, organic titanate and a xanthene type dye. The presence of a copper salt in the solution improves the light fastness of the colored glass article. Salts of aluminum, lead, antimony and trivalent titanium stabilize the solution to prevent the titanate from precipitating from the solution.

---

The present invention relates to a coloring solution and it has particular relation to a coloring solution which can be used to apply a permanent color to a glass article.

It has long been a desideratum of the art to be able to dye or color glass articles after the glass has been melted, shaped and cooled to room temperature. It is well known that colored glass articles can be made by including ingredients in the glass batch that will color the glass throughout. This method of coloring glass presents inventory problems when a plurality of colored glass articles are desired or where only portions of the article are to be colored. Low melting colored glass frits have been employed as coatings, but they are usually opaque and are unsatisfactory where colored, transparent articles are desired. Transparent metal oxide films which are developed on the glass at high temperatures have been employed, but the color selection is limited to the natural color of the oxide films. Typical patents illustrating such metal oxide films are U.S. Patents Nos. 2,584,763 and 2,593,817. Some attempts have been made to incorporate organic dyes on glass surfaces; however, problems of durability and light fastness have been encountered. For example, chrome complexes of various colorants have been applied to glass as shown in U.S. Patents Nos. 2,951,739 and 3,023,072, and British Patent No. 825,010. Colors that have the required light fastness usually have involved the use of opaque pigments or dispersed dyes. Where transparency is desired, pigments cannot be resorted to unless of colloidal dimensions.

In accordance with the present invention, a coloring solution for glass surfaces has been developed which is easy to apply and which results in the formation of a transparent, durable, tightly adherent colored film on the glass surface. The colored films exhibit unusual light fastness properties. The coloring solution is composed of a stable solution of the reaction product of a hydrolyzable organic titanate and an organic dye, preferably of xanthene type.

The exact chemical nature of the reaction product is not known; however, it is postulated that some type of chelate structure is created by the reaction. It is further postulated that the firm bond which is created between a silicate glass and the reaction product is the result of a silicon-oxygen-titanium bonding between the silicon of the glass and the titanium of the reaction product.

The formation of the coating solution is relatively simple. It merely involves preparation of a stable solution of the titanate and adding the dye to the solution. This can be done at room temperature and at atmospheric pressure. It is important that a solvent or carrier be selected that will permit the titanate to be uniformly dispersed in a stable form in the carrier. Thus the titanate is dissolved in the solvent or suspended as a very fine, clear, colloidal dispersion in the carrier. The term "solution" as used herein and in the claims is intended to include and cover both of such physical forms.

The preferred solvent for the titanate is methanol; however, the titanate can be employed in any liquid carrier or solvent that results in a stable solution, i.e., one in which the titanate does not precipitate out as a solid. Various stabilizing agents can be employed with the titanate solution if it exhibits unstable precipitating tendencies.

One titanate ester which has been found to be particularly suitable in the practice of the invention is tetraisopropyl titanate. Other useful titanates are those described in U.S. Patents Nos. 2,614,112, 2,621,195, 2,710,267, 2,768,909 and 2,941,903. These titanates have, for example, the formula $(RO)_4Ti$ wherein R is an alkyl radical having from 1 to 18 carbon atoms, preferably 1 to 8 carbon atoms. The titanate solutions are described in these patents as being anhydrous. but having the possibility of the presence of a minor amount of water, such as a mixture of 90 percent methanol and 10 percent water. Approximately 0.1 to 20 percent by weight of the titanate is useful in the coating solution. The amount of titanate applied to the base is preferably about 0.0003 to 0.0375 gram molecule of ester per square meter of base surface. Such amount can be conveniently obtained by use of an anhydrous solution containing about 0.05 to 0.525 gram molecule per liter of solution.

Many organic dyes can be used in the practice of the invention. Best results have been obtained on massive glass articles such as flat glass with xanthene class dyes. These dyes are derivatives of xanthene and are characterized by the presence of the xanthylium nucleus as the chromophore. Included in the xanthene class of dyes are the pyronines, sacchareins, succineins, rosamines, rhodamines, rhodoles and phthaleins, the latter being the preferred type. The chemical structures of xanthene and some derivatives found useful in the practice of the invention are as follows:

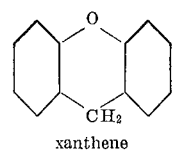

xanthene

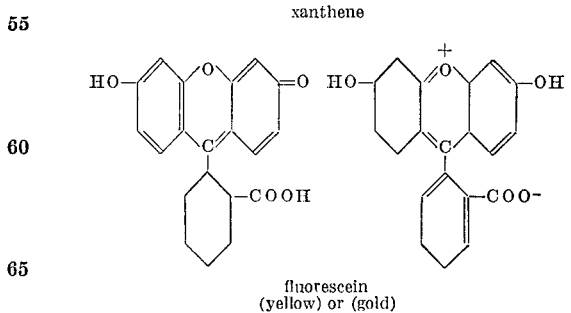

fluorescein
(yellow) or (gold)

3

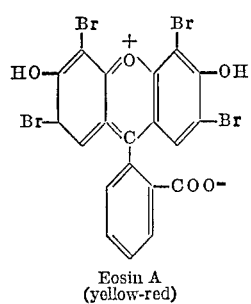

Eosin A
(yellow-red)

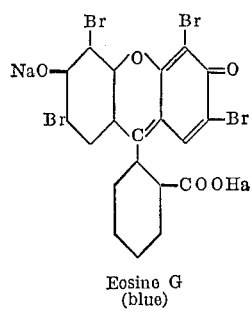

Eosine G
(blue)

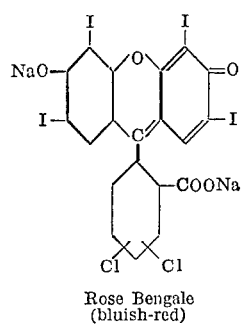

Rose Bengale
(bluish-red)

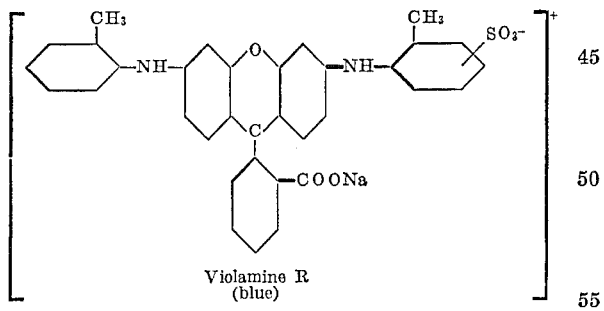

Violamine R
(blue)

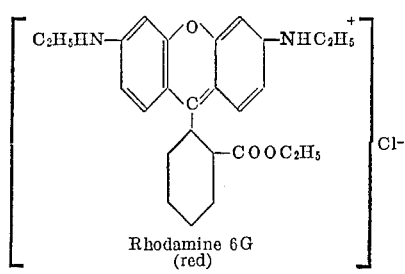

Rhodamine 6G
(red)

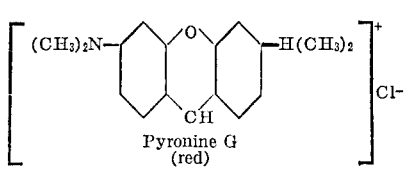

Pyronine G
(red)

4

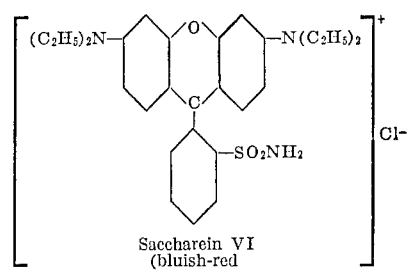

Saccharein VI
(bluish-red)

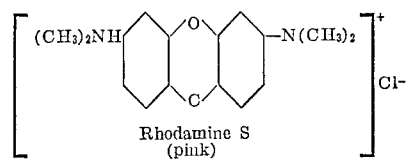

Rhodamine S
(pink)

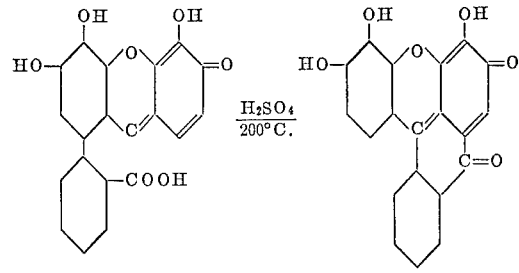

Gallein                Coerulein
(blue-violet)          (green)

Although the xanthene dyes have been found to be preferable in the tinting of flat glass, the invention is not limited to the use of such dyes especially with regard to the coloring of glass fibers. The tinting of glass fibers, in yarn or fabric form, is accomplished by the xanthene dyes and many other dyes such as ketone imines, safranines, triphenylmethane amino derivatives, and diphenyl-naphthylmethane derivatives, examples of which are as follows:

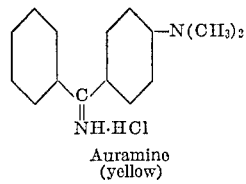

Auramine
(yellow)

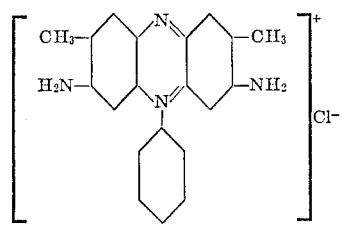

Safranine T
(blue)

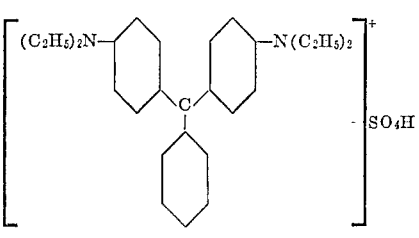

Brilliant Green

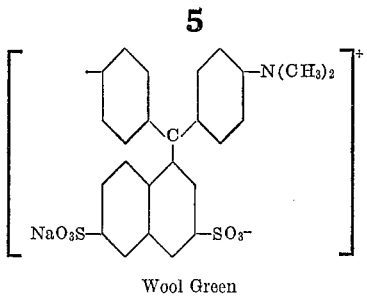

Wool Green

The reason why glass fibers can be more readily dyed with a greater variety of dyes than flat glass is not known.

The amount of dye employed in the coloring solution is difficult to state on a weight basis due to the complex nature of the variety of suitable dye molecules. In order to get maximum effectiveness of the dye, one mole of dye per mole of titanate can be employed. Substantially lower amounts of dye on a mole basis, i.e., 0.01 to 0.5 mole of dye to one mole of titanate are sufficient to obtain good coloring. Lighter shades, of course, can be obtained by using a lesser amount of dye in relation to the titanate or by using a lower concentration of the reaction product in the solution. Furthermore, combinations of dyes can be used to get different colors and hues.

It has been found that certain properties of the finished article can be improved by the addition of certain metal salts to the solutions. For example, the light fastness of the colored article is improved by the inclusion of copper salts in the solutions, especially when the final product is exposed to liquid water. Copper sulfate (hydrated or anhydrous) copper halides, such as copper chloride ($CuCl_2$), copper bromide ($CuBr_2$) and copper fluoride ($CuF_2$), copper acetate and copper nitrate

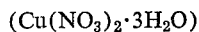

have been used to improve the light fastness properties of the colored articles. About 0.1 to 5 percent by weight of the copper salt based upon the weight of the coloring solution adequately serves this purpose.

The copper salts as well as some additional soluble salts serve the function of stabilizing the solution with respect to prevention of precipitation of the titanium ester from the solution. The soluble halides and nitrates of aluminum, lead, antimony and trivalent titanium aid in the stabilization of the coloring solution. About 0.2 to 15 percent by weight of these additional salts used alone or in combination based upon the weight of the solution adequately serve this purpose. It is important to state, however, that whereas copper salts stabilize the titanium ester in the solution, they also tend to precipitate the dye in the solution in the absence of aluminum salts; therefore, both aluminum and copper are usually employed in the solution. Gelatine can be used as a substitute for aluminum in this respect.

Use of the halides of the metals described above provides the best stability or shelf life to the coloring solutions. It has been found, however, that the halide solutions produce an objectionable degree of haze and loss of silver adhesion to the glass in mirrors. This haze and adhesion problem does not occur in the absence of halides and therefore it is concluded that the halide salts have some objectionable effect on the silver or the materials used in sensitizing the glass or catalyzing the silvering process. The reason for this is not known and is further obscured by the fact that the use of halongenated dyes, i.e., the halogenated fluoresceins (Eosin), does not create the haze effect. Use of the nitrates and sulfates of the above-mentioned metals in the coloring solutions avoids the haze in tinted mirrors.

Other materials which are useful for stabilizing the titanate in solution are acids such as citric and acetic acid and bases such as lithium, sodium and potassium hydroxide. Small amounts, of the order of 0.01 to 2.0 percent by weight of these materials, are useful.

The total amount of solids, i.e., titanate plus dye plus stabilizing agents, should not be more than 40 percent by weight of the solution, preferably not more than 20 percent by weight of the solution, in order to prevent precipitation of one or more of said solids from the solution.

The solution is prepared merely by adding the ingredients to each other and mixing them at room temperature. The solution can be prepared in glass containers or in plastic containers such as those made of polyethylene, polystyrene and polymethyl methacrylate. The solution should not be mixed in containers of copper, titanium, stainless steel, aluminum, brass, galvanized steel, Inconel, Monel or lead since these metals in contact with the solution cause precipitation of the dye.

The solution is applied to the glass article at room temperature. The application can be by dipping, painting or any other method convenient for applying a uniform coating of a liquid material.

The glass article may be in the form of flat glass such as made by the commonly known plate, sheet or float processes. It may also be in pressed, centrifuged, attenuated, molded or blown glass form such as glass blocks, cathode ray tubes, fibers, tubing, ophthalmic and optical lenses, bottles and other forms. The term "flat" glass also includes glass articles made according to the above described processes and thereafter bent, shaped and/or laminated to produce fabricated glass articles. Such flat glass articles are made from conventional lime-soda-silica glasses. Opaque glasses such as "milk" glass and structural, flat, white or ivory Carrara glass can also be tinted different colors and thereby solve an inventory problem. Such glasses are shown in U.S. Patent No. 2,683,616. The ophthalmic glasses are made from a variety of glasses, some of which may not contain any silica. Some of these glasses are shown in U.S. Patents Nos. 2,150,694, 2,542,489 and 2,913,345. Fiber glass is made from a borosilicate glass having a composition such as set forth in U.S. Patents Nos. 2,344,961 or 2,571,074. Examples of the compositions of various commercial glasses of the types above described are set forth in Tables IA–II (page 4), IA–III (page 5) and IIH–I (page 22) of the Handbook of Glass Manufacture by F. V. Tooley published in 1953 by Ogden Publishing Company.

Although it is theorized above that the bond with the glass is by an Si—O—Ti linkage, it may be that the hydrolysis and condensation which apparently takes place in the bonding of the colored film to the glass surface merely involves reaction of the film of coating solution with tightly bound hydroxyl groups normally present on the surface of glass articles. This would explain the success of the invention with regard to the coloring of non-silicate glasses. This also permits application of the invention to the coloring of other materials normally having hydroxyl groups present on their surface or contained in the molecular structure of the material. One restriction is that the material to be colored can withstand the curing temperatures required (about 200° C.).

After application of the coating solution to the glass surface, the coated glass article is heated to bake or cure the coating on the glass. The heating step is necessary to develop the light fastness properties of the colored films. Exposure of the coated glass to temperatures of 400° F. to 500° F. for 60 to 10 minutes is satisfactory to accomplish the bonding of the coating to the glass. The curing treatment is time-temperature dependent and thus the exposure may be varied greatly depending upon the production situation. For example, exposure of the coated glass article to a temperature of 1250° F. for 5 to 20 seconds is within the scope of the invention. The thickness of the films produced is 200 to 5000 angstroms, preferably 300 to 3000 angstroms.

Further details and embodiments of the invention can be explained and understood in the following examples:

EXAMPLE I

Flat glass plates 24 x 24 x ¼ inches are dipped in the solutions set forth in Table I. The ingredients are added and mixed in a suitable glass mixing container in the amounts listed and in the order listed in the table, beginning at the top of the table. No special mixing procedure is necessary. The films are cured at 400° F. for 30 minutes. The films are approximately 500 angstroms thick.

During the filming of large glass plates, haze bands can develop across the plate in a direction normal to the direction of withdrawal. These haze bands are detected only after the plate is silvered for mirrors. The theory of this haze development is that the evaporation of the solvent during film forming absorbs heat from the surrounding air. Eventually the dew point of this air is reached. At this point, moisture from the air condenses on the film and this dries the air space. The lower part of the plate enjoys a normal treatment. The top part of the plate escapes this haze effect because it is dry before the dew point is reached. It is therefore desirable to withdraw the glass at a speed which is more than sufficient to overcome this effect.

In the dipping process above described, the top inch or so of the plate is uncoated. This portion can be easily cut off after the coating is cured on the plate.

TABLE I.—COMPOSITION OF VARIOUS TITANIA-DYE TINTING SOLUTIONS

|  | 1 | 2 | 3 | 4 | 5 | 6 | 7 | 8 | 9 | 10 | 11 | 12 | 13 |
|---|---|---|---|---|---|---|---|---|---|---|---|---|---|
| Methanol, cubic centimeters | 100 | 100 | 100 | 100 | 100 | 100 | 100 | 100 | 100 | 100 | 100 | 100 | 100 |
| $AlCl_3.6H_2O$, grams | .8 | 1.4 |  |  |  | 1.4 | 2.0 |  | 2.0 | 1.4 |  |  | 1.4 |
| $Al(NO_3)_3.9H_2O$, grams |  |  | 2.5 |  | 2.5 |  |  | 2.5 |  |  | 2.5 | 2.5 |  |
| $CuSO_4$, grams |  |  | .75 | .75 |  |  |  | .75 |  |  | .75 | .75 |  |
| $CuSO_4.5H_2O$, grams |  |  |  |  | 1.0 | 1.0 |  | 1.0 | 1.0 |  |  | 1.0 | 1.0 |
| $CuBr_2$, grams | .3 |  |  |  |  |  |  |  |  |  |  |  |  |
| LiOH, grams |  |  |  | .4 |  |  |  |  |  |  |  |  |  |
| $H_2O$, cubic centimeters |  |  |  | .75 |  |  |  |  |  |  |  |  |  |
| Tetraisopropyl titanate, cubic centimeters | 6 | 6 | 6 | 10 | 6 | 6 | 6 | 6 | 6 | 6 | 6 | 6 | 6 |
| Fluorescein, grams | .2 | .2 | .2 | .5 | .2 | .2 |  |  |  |  |  |  |  |
| Dibromo-fluorescein, grams |  |  |  |  |  |  | .2 | .2 | .2 |  |  |  |  |
| Eosin Y, grams |  |  |  |  |  |  |  |  |  | .2 | .2 | .2 | .2 |
| Color | (¹) | (¹) | (¹) | (¹) | (¹) | (¹) | (²) | (²) | (²) | (³) | (³) | (³) | (³) |

¹ Gold.  ² Flesh.  ³ Red.

Some precautions are necessary during the dipping in order to get a uniform coating on the flat glass. The flat glass is gripped along its top edge by a pair of tongs. The glass is dipped into the coating solution in a container. The descent of the glass is stopped short of complete immersion of the glass so that the tongs and top edge do not enter the solution. This is necessary to prevent streaking from run-off of the solution from the top edge of the glass and from the tongs upon withdrawal of the glass. The glass is maintained in the solution for a length of time sufficient for simple wetting of the glass surface with the solution. Dipping for a longer period than this is not necessary.

The withdrawal of the glass from the coating solution is critical. The glass is withdrawn at a slow, steady rate, i.e., 30 inches per minute. The film formation on the glass occurs as the coated glass rises from the solution and as the solvent evaporates from the coating clinging to the glass. Anything which changes the rate of evaporation during withdrawal is liable to cause streaks in the colored film on the surface of the glass which are different in appearance from the remainder of the film. Such effect may be created by the occurrence of waves on the surface of the coating bath.

The effect may also be created by turbulence or uneven movement of air immediately above the solution bath thereby effecting change in the evaporation rate of the solvent as the glass is withdrawn from the bath. For this reason, it has been found desirable to enclose the area above the bath from the surrounding atmosphere in order to eliminate the effects of stray currents of air in the factory. Such stray currents also affect the humidity or moisture condition of the air above the bath, which condition is an important variable which affects the evaporation rate of the solvent. Likewise the temperature of the air above the bath should be controlled and not allowed to vary substantially in order to insure uniform evaporation of the solvent from the coating. These precautions permit obtaining of films of uniform thickness which are free from iridescence. This is true with regard to films having a thickness of greater than 500 angstroms which are particularly subject to iridescence caused by thickness non-uniformity produced by conventional techniques.

EXAMPLE II.—MIRRORS

Tinted mirrors are made utilizing solutions Nos. 5, 8 and 12 from Table I to make respectively, gold, flesh and red tinted mirrors. Conventional plate glass samples, 4 x 5 inches, are utilized. The glass is cleaned using a 50–50 weight percent solution of water and N propyl alcohol. The glass is then immersed vertically in the tinting solution and withdrawn smoothly at a speed of 30 inches per minute. The film is decoated from one side of the plate using a wet cloth. The film prior to curing by heat treatment is very water soluble and easy to decoat with water.

The coated glass is heated to a temperature of 400° F. for 30 minutes, and then allowed to cool slowly to avoid breakage. The film is now durable and ready for the silvering process.

The film is sensitized by rinsing it with a solution consisting in weight percent of:

| Ingredient— | Weight percent |
|---|---|
| Water | 50 |
| Isopropyl alcohol | 49 |
| $TiCl_3$ or SnCl | 1 |

The final steps are accomplished according to the conventional mirror process. This includes silvering by exposing the sensitized film to the following solutions:

Silver solution

| Ingredient— | | Proportions |
|---|---|---|
| Silver nitrate | g | 5 |
| Caustic soda | g | 5 |
| Ammonium hydroxide (28% solution) | cc | 15 |
| $H_2O$ | ml | 1000 |

Reducer solution

| Ingredient— | | Proportions |
|---|---|---|
| Dextrose | g | 10 |
| Water | ml | 1000 |

A copper coating and a protective paint backing are thereafter applied.

The mirrors are tested as described below with the results being set forth in Table II.

(1) *Adhesion (pull test).*—This test consists of scratching through the backing and film down to the base glass, applying Scotch tape over this area, then pulling off the tape. Poor adhesion is signified by having the backing and silver pulled from the glass with the tape.

(2) *Salt spray.*—Mirror samples are subjected for 120 hours to a 20 percent salt spray. An evaluation is made by noting the deterioration of the different samples.

(3) *High humidity.*—The samples are subjected for 60 days in a 120° F. high humidity room, then checked for deterioration.

(4) *"Fadometer (Atlas Fade-Ometer)."*—Tinted mirror samples are exposed in the fadometer, then checked for fade characteristics.

cording to the following description of the invention. Clear, etched, plate glass approximately 21 x 17 x ⅛ inches in dimension was used. The glass is bent and then etched on both sides by a chemical etching process as described in our pending application Ser. No. 456,963, filed May 19, 1965. The etched plate is held by tongs from one corner and dipped in solution No. 2 set forth in Table I and withdrawn as described in Example I. The convex side of the plate is washed clear of the coloring solution with water and a wet cloth. The coated plate is then cured at a temperature of 400° F. for 30 minutes. A durable gold film approximately 500 angstroms thick is obtained on the concave side of the plate. The visible transmittance of the plate measures 74 percent.

TABLE II.—RESULTS OF VARIOUS TESTS OF TINTED MIRRORS

| Solution | Sensitizer | Appearance Prior to Testing | Pull Test | 60 Days, 120° F. Humidity | Salt Spray, 120 hrs. | Fade-Ometer (hrs.) | | | |
|---|---|---|---|---|---|---|---|---|---|
| | | | | | | 133 | 331 | 679 | 926 |
| 5 | $SnCl_2$ | Good | Good | Good | Good | No Fade | | No Fade | No Fade. |
| 5 | $TiCl_3$ | do | do | do | do | do | | do | Do. |
| 12 | $SnCl_2$ | do | do | do | Fair* | | No Fade | | |
| 12 | $TiCl_3$ | do | do | do | Fair+* | | do | | |

*Commercially acceptable.

EXAMPLE III.— GLASS FIBER FABRICS

Glass fiber fabrics are tinted as follows. The glass fiber fabric is 181 cloth woven from ECG 225 yarn. The fabric is heat cleaned of all sizing ingredients by first heating it to 650° F. for 48 hours. The fabric is then cooled to room temperature and dipped in a solution made up as in Example I, solution No. 6. The following colors are obtained by the use of 0.2 gram of the dyes listed:

Color— Dye
- Red _____ Eosin Y.
- Orange _____ Fluorescein.
- Yellow _____ Auranine O.
- Purple _____ Violamine 3B.
- Dark blue _____ Safranin O.
- Dark green ____ Du Pont anthraquinone green GN.
- Brown _____ Crocein scarlet 7B.
- Grey _____ Gentian violet.

The dipped samples are heated for 30 minutes at 400° F. to cure the colors on the fabric. The dyed fabrics exhibit excellent light fastness and film durability.

EXAMPLE IV.—OPHTHALMIC LENSES

Various samples of polished ophthalmic lenses are coated with solution No. 9 from Table I to apply a flesh tint to the glass lenses for ophthalmic purposes. The lenses are recessed in a rubber sheet to protect the edges and laid on a conveyor which carried them at a rate of about 30 inches per minute into and out of a bath. The following glass compositions are tinted:

TABLE III

| Ingredient | Composition No. | | | | |
|---|---|---|---|---|---|
| | 1 | 2 | 3 | 4 | 5 |
| | Ophthalic | Ophthalmic | Optical; Flint | Borosilicate Crown | Spectacle Crown |
| $B_2O_3$ | 12 | 40 | | 9.9 | |
| BaO | | 20 | 13.4 | 2.5 | |
| $Ta_2O_5$ | 28 | | | | |
| $TiO_2$ | 12 | | | | |
| $ZrO_2$ | 6 | | | | |
| $La_2O_3$ | 42 | 20 | | | |
| $ThO_2$ | | 20 | | | |
| $SiO_2$ | | | 49.8 | 69.6 | 73.0 |
| $Al_2O_3$ | | | 0.1 | | |
| CaO | | | | | 12.0 |
| PbO | | | 18.7 | | |
| $Na_2O$ | | | 1.2 | 8.4 | 14.0 |
| $K_2O$ | | | 8.2 | 8.4 | 1.0 |
| ZnO | | | 8.0 | | |
| $As_2O_5$ | | | 0.5 | 0.3 | Tr. |

The glasses are tinted with the flesh color by use of solution No. 9 described in Table I.

EXAMPLE V.—TV IMPLOSION PLATE

A tinted TV implosion plate is made and utilized ac-

The colored implosion plate is then laminated to the face of the TV tube with a polyester resin by conventional laminating techniques. The coated side of the plate is adhered to the plastic interlayer. The visible transmittance of the colored, laminated plate measures 79 percent, an increase of 5 percent over the unlaminated colored plate. This increase is due to the reduction in reflectance due to the difference in the media adjacent the colored film. The colored, coated plate as thus produced is useful and esthetically pleasing as a TV implosion plate. The implosion plate is especially useful in enhancing color contrasts in color television viewing.

EXAMPLE VI.—PICTURE GLASS

Tinted picture glass is made by dipping sheet glass into solutions No. 2 or 7. The sheet is withdrawn vertically from the bath at a speed of about 10 inches per minute. At this slower speed, a thinner film is applied to the major surfaces of the sheet. The thickness of film formed is proportionate to the withdrawal rate and thus a thinner film is formed at the slower speed. The film is then cured at 400° F. for 30 minutes. A durable, lightly tinted, uniform colored film having a thickness of 400 angstroms is present on the sheet. The sheet, coated with solution No. 2, is tinted gold and has a transmittance of 80 percent. The sheet, coated with solution No. 7, is tinted flesh color and has a transmittance of 80 percent. The films withstand cleaning with any type of liquid glass cleaner.

EXAMPLE VII.—OPAQUE STRUCTURAL PANELS

Various colored opaque, structural, flat glass panels are made from a commercial, white opaque, structural glass having an approximate composition in percent by weight as follows:

| | Percent |
|---|---|
| $SiO_2$ | 67.5 |
| $Na_2O$ | 8.6 |
| $K_2O$ | 3.3 |
| CaO | 10.6 |
| $Al_2O_3$ | 6.01 |
| $F_2$ | 5.7 |
| PbO | 0.1 |
| Minor constituents | 0.62 |

The panels are treated with coloring solutions by dipping them in the solution in the manner described in Example I with a solution made according to the method described for solutions Nos. 6, 9 and 13 in Table I. The following colors are obtained by using the specified amounts of the listed dyes. The films are durable and exhibit excellent light fastness.

Color: Dye
- Gold — Fluorescein.
- Flesh — Dibromofluorescein.
- Red — Eosin Y.

EXAMPLE VIII.—GLASS FIBER YARNS

Commercial glass fiber yarn designated as ECG 150 1/0 1Z is permanently dyed by the present invention by passing either the yarn or a fabric through a bath containing the coloring solution and thereafter heat treating the colored yarn or fabric to fix the color permanently in the colored product. The yarn is colored individually or as wrapped on a quill. The filled quill is dipped in the coloring solution and is then heated in a furnace maintained at 400° F. for 30 minutes to cure the coating on the yarn. The (1) condition of glass sample, (2) solutions utilized, (3) dyeing conditions and (4) heat treating employed in the various tests are shown in Table IV.

TABLE IV

| Sample | Dye Solutions Example 6, Table I with Dye Listed Below | Dye Application | Heat Treatment | | Finish | Color |
|---|---|---|---|---|---|---|
| | | | Temp., °F. | Time | | |
| 1. Coronized yarn | Fluorescein | 17 feet per minute through bath. | 450 | 50 seconds | None | Orange. |
| 2. Coronized yarn | do | 70 feet per minute through bath. | 450 | 12 seconds | do | Gold. |
| 3. Wound on quill, starch-oil size. | do | Quills soaked for 30 minutes. | 450 | 30 minutes | do | Light flesh. |
| 4. Wound on quill, acrylic size. | do | do | 450 | do | do | Medium flesh. |
| 5. Wound on quill, polyvinyl acetate size. | do | do | 450 | do | do | Dark flesh. |
| 6. Wound on quill, epoxy size. | do | do | 450 | do | do | Reddish flesh. |
| 7. Coronized yarn | Violamine | 17 feet per minute through bath. | 450 | 50 seconds | do | Violet. |
| 8. Coronized yarn | do | do | 450 | 25 seconds | Acrylic emulsion plus another heat treatment, 17 feet per minute. | Do. |
| 9. Coronized yarn | do | 70 feet per minute through bath. | 450 | 6 seconds | Acrylic emulsion plus another heat treatment, 70 feet per minute. | Blue. |
| 10. Coronized yarn | do | do | 450 | 12 seconds | None | Reddish purple. |
| 11. Wound on quill, epoxy size. | do | Quill soaked for 30 minutes. | 400 | 30 minutes | do | Light violet. |
| 12. Wound on quill, epoxy size. | do | do | | | Acrylic emulsion at 17 feet per minute plus heat treatment of 400° F. for 30 minutes. | Do. |
| 13. Coronized yarn | Crocein scarlet-MOO. | 17 feet per minute through bath. | 450 | 30 minutes | None | Light tan. |
| 14. Coronized yarn | do | do | 450 | 15 minutes | Acrylic emulsion at 17 feet per minute plus additional heat treatment. | Do. |
| 15. Coronized yarn | Safranin O | do | 450 | 30 minutes | None | Violet. |
| 16. Coronized yarn | do | do | 450 | 15 minutes | Acrylic emulsion at 17 feet per minute plus additional heat treatment. | Dark violet. |
| 17. Coronized yarn | Auramine O | do | 450 | 30 minutes | None | Light gold. |
| 18. Coronized yarn | do | do | 450 | 15 minutes | Acrylic emulsion at 17 feet per minute plus additional heat treatment. | Yellow tan. |

NOTE.—Coronized is a term which is applied to yarn (or fabric) which is passed through a furnace maintained at 1,150° F. to remove the size and heat set the individual fibers if they are woven or otherwise entwined.

The present invention has enabled the production of a plurality of colored glass articles by a novel coating method. The invention is particularly unique in that colored articles are obtained which exhibit excellent light fastness properties with organic dyes which are notoriously poor with respect to this property when previously used.

Although the invention has been described with respect to details of the best modes of carrying out the invention presently known to the inventors, such details are not intended to serve as limitations on the scope of the invention, except as set forth in the following claims.

We claim:

1. A coloring solution comprising a stable solution of the reaction mixture of a hydrolyzable, organic titanate and a xanthene type dye with a solids content of not more than 40% by weight of the solution.

2. The solution of claim 1 containing a light stabilizing amount of a copper salt.

3. The solution of claim 2 containing a solution stabilizing amount of an inorganic salt selected from the group consisting of the soluble salts of aluminum, lead, antimony and trivalent titanium.

4. A method of coloring a glass article which comprises applying to the surface of the glass article a thin coating of the solution described in claim 1 and heating the coated article for a time and at a temperature sufficient to develop light fastness properties to the colored glass article.

5. The method of claim 4 utilizing the solution comprising a stable solution of the reaction mixture of hydrolyzable, organic titanate and a xanthene dye with a solids content of not more than 40% by weight of the solution containing a light stabilizing amount of a copper salt.

6. The method of claim 5 wherein the solution additionally contains a solution stabilizing amount of an inorganic salt selected from the group consisting of the soluble salts of aluminum, lead, antimony and trivalent titanium.

7. A colored glass article produced according to the method of claim 4.

8. Colored glass fibers produced according to the method of claim 4.

9. A transparent, colored glass article produced according to the method of claim 4.

10. A transparent, colored flat glass article produced according to the method of claim 4.

11. A colored glass article produced according to the method of claim 5.

12. A colored glass article produced according to the method of claim 6.

References Cited

UNITED STATES PATENTS

| | | | |
|---|---|---|---|
| 2,139,471 | 12/1938 | Schmidt | 260—429.5 |
| 2,345,485 | 3/1944 | Krzikalla | 260—429.5 |
| 2,452,606 | 11/1948 | Siegel | 106—300 |
| 2,492,959 | 1/1950 | Blumenthal | 260—336 |

JULIUS FROME, *Primary Examiner.*

T. MORRIS, *Assistant Examiner.*

U.S. Cl. X.R.

8—8, 29; 117—124